Patented May 26, 1936

2,041,745

UNITED STATES PATENT OFFICE 2,041,745

MANUFACTURE OF CELLULOSIC PRODUCTS FROM WOOD, STRAW, GRASS, AND THE LIKE

Henry Dreyfus, London, England

No Drawing. Application February 11, 1933, Serial No. 656,363. In Great Britain March 4, 1932

8 Claims. (Cl. 92—2)

This invention relates to the manufacture of cellulose or cellulosic materials from wood, straw, grass and the like.

In the production of cellulosic materials from wood, straw, grass and the like (and particularly from wood) it is a matter of great difficulty to obtain pure cellulose or cellulosic products by processes involving the treatment of the materials with acid liquors such as the sulphite process, as the acid liquors have but little destructive or dissolving action upon impurities such as resins originally present in the wood, straw, grass or the like.

According to the invention I have now found that highly useful and highly purified celluloses and cellulosic materials can readily be obtained if the wood, grass or the like is first treated with a liquor adapted to remove or separate the resins and the like, and particularly with dilute caustic alkali.

Whilst I prefer to use alkaline substances and particularly dilute caustic alkali, other substances adapted to remove or separate the resins and the like may if desired be employed instead of or in conjunction with alkaline substances such as caustic soda.

The dilute caustic alkali (e. g. caustic soda) may be employed alone or in conjunction with water. In the cases where both dilute caustic alkali and water are employed the treatment with dilute caustic alkali may be both preceded and succeeded by treatment with water.

When employing dilute caustic soda or other dilute caustic alkali (whether or not treatment with water is to be employed), I prefer to use dilute caustic alkali of less than about 1% strength, e. g. of about ¼ to 1% strength. Stronger solutions of caustic alkali, such for instance as up to about 5% can, however, be used. The dilute caustic alkali may with advantage be applied at low or ordinary temperatures (e. g. from about 0° to 25° C.) or somewhat higher temperatures (e. g. 30° to 45° C.). Higher temperatures or even boiling temperatures may be employed but their use is not so advantageous. With caustic alkalies of concentration between about ¼ and 1% temperatures below about 50° C. (and particularly below about 45° C., e. g. between about 25° and 45° C.) should be employed if the full advantage of the invention is to be attained. With the higher concentrations of alkali (e. g. 2–5%) it is preferable to use temperatures of about 0° to 25° C. As above indicated the treatment with caustic alkali can, if desired, be made in conjunction with treatment with water, for instance one or more treatments with dilute caustic alkali can be preceded and/or succeeded by treatment or treatments with water. Further, in cases where a number of treatments with dilute caustic alkali are employed, the treatments with water may, if desired, be performed alternately with the dilute alkali treatments.

When treatment with substances other than alkaline substances is to be performed, whether or not such treatment is effected conjointly with treatment with dilute caustic alkali, it is often advantageous to perform the treatment with such substances at elevated or even boiling temperatures.

The treatment with dilute caustic alkali and/or other substances of the character referred to is preferably continued until substantially all the soluble resins or other soluble matters are removed.

After subjecting the wood, straw, grasses or the like to the treatment with water and/or dilute caustic alkali, it may be subjected to treatment with the acid cooking liquor, e. g. to a sulphite pulping process or cook, in any convenient manner. For instance, it may be subjected to the action of calcium or magnesium bisulphites by the Mitscherlich, Ritter-Kellner or "quick cook" methods or other methods heretofore employed in the sulphite pulp industry, whether direct (i. e. direct steam) or indirect heating is employed. I prefer, however, to subject the materials to the action of bisulphites by the process described in U. S. application S. No. 656,362, filed February 11, 1933 corresponding to British Specification No. 6540/32, namely with solutions of bisulphites containing very restricted quantities of free sulphur dioxide (e. g. 2 to 10% relatively to the combined $SO_2$ present) or containing no free sulphur dioxide. As indicated in the said U. S. application S. No. 656,362 liquors containing any soluble bisulphites may be employed, whilst sodium or potassium bisulphites are especially suitable. The bisulphites may be employed for such process in any convenient concentration (e. g. as liquors containing between about 2 to 5 to 8% of combined $SO_2$). The heating in such process may, if desired, be performed by direct or indirect heating with high pressure steam.

The cooking with the acid liquors may advantageously be performed under pressures greater than those developed by the cooking liquors employed. Not only does the higher pressure have a very beneficial effect in promoting more even attack of the liquors, but it accelerates the removal or separation of encrusting substances from the materials. Moreover with the higher pressures lower temperatures may be employed in the cooking operation. The higher pressure may be attained by pumping in inert gases or vapours under pressure into the digesters or vessels and/or by adding to the materials or otherwise introducing into the vessels or digesters volatile liquids or other substances adapted to generate vapours or gases. The total pressure employed in such forms of execution may, for instance, be up to about 10 to 20 atmospheres or even up to 100 or more atmospheres.

It is to be understood, however, that the invention is not limited to the use of the higher pressures and that the treatment may be performed under pressures normally developed by the particular liquors.

In performing the invention the wood, straw, grass or the like may, if desired, be treated or impregnated with wetting out agents (especially Turkey red oil and the like) either prior to or simultaneously with the treatment with dilute caustic alkali or other substances of the character hereinbefore indicated and/or prior to or simultaneously with the treatment with the acid liquor.

By means of the invention it is possible to obtain highly useful and highly purified cellulose or cellulosic materials which are substantially free from resins and the like. Moreover cellulose or cellulosic materials obtainable by the process of the invention are highly useful for the manufacture of cellulose esters and derivatives and artificial silk, films and other products made from such esters and derivatives.

What I claim and desire to secure by Letters Patent is:—

1. A process of manufacturing cellulosic products which comprises treating lignocellulosic materials with an alkali metal hydroxide solution of concentration below 5% at a temperature below 50° C. and under atmospheric pressure, and subsequently subjecting the materials to the action of a hot solution of an alkali metal bisulphite in which the ratio $SO_2:M_2O$ (where M is the alkali metal) is between 2.0 and 2.2 inclusive.

2. A process of manufacturing cellulosic products which comprises treating lignocellulosic materials with an alkali metal hydroxide solution of concentration between ¼ and 1% at a temperature below 50° C. and under atmospheric pressure, and subsequently subjecting the materials to the action of a hot solution of an alkali metal bisulphite in which the ratio $SO_2:M_2O$ (where M is the alkali metal) is between 2.0 and 2.2 inclusive.

3. A process of manufacturing cellulosic products which comprises treating lignocellulosic materials with an alkali metal hydroxide solution of concentration between ¼ and 1% at a temperature between 25° C. and 45° C. and under atmospheric pressure, and subsequently subjecting the materials to the action of an alkali metal bisulphite in which the ratio $SO_2:M_2O$ (where M is the alkali metal) is between 2.0 and 2.2 inclusive.

4. A process of manufacturing cellulosic products which comprises treating lignocellulosic materials with an alkali metal hydroxide solution of concentration below 5% at a temperature below 50° C. and under atmospheric pressure, and subsequently subjecting the materials to the action of a hot solution of an alkali metal bisulphite in which the ratio $SO_2:M_2O$ (where M is the alkali metal) is between 2.0 and 2.2 inclusive, and treating the materials with water at any stage prior to their subjection to treatment with the bisulphite solution.

5. A process of manufacturing cellulosic products which comprises treating lignocellulosic materials with an alkali metal hydroxide solution of concentration below 5% at a temperature below 50° C. and under atmospheric pressure, and subsequently subjecting the materials to the action of a hot solution of an alkali metal bisulphite in which the ratio $SO_2:M_2O$ (where M is the alkali metal) is between 2.0 and 2.2 inclusive, and treating the materials with water at a temperature below 100° C. at any stage prior to their subjection to treatment with the bisulphite solution.

6. A process of manufacturing cellulosic products which comprises treating lignocellulosic materials with an alkali metal hydroxide solution of concentration between ¼ and 1% at a temperature between 25° C. and 45° C. and under atmospheric pressure, and subsequently subjecting the materials to the action of a hot solution of an alkali metal bisulphite in which the ratio $SO_2:M_2O$ (where M is the alkali metal) is between 2.0 and 2.2 inclusive, and treating the materials with water at a temperature below 100° C. at any stage prior to their subjection to treatment with the bisulphite solution.

7. In the manufacture of cellulosic products from lignocellulosic materials, the steps of treating the said materials with a substantially sulphur-free aqueous solution of alkali hydroxide of concentration below 5% at a temperature below 50° C. and under atmospheric pressure, and subsequently subjecting the materials to the action of a hot solution of an alkali metal bisulphite in which the ratio $SO_2:M_2O$ (where M is the alkali metal) is between 2.0 and 2.2 inclusive.

8. In the manufacture of cellulosic products from lignocellulosic materials, the steps of treating the said materials successively with a substantially sulphur-free aqueous solution of alkali hydroxide of concentration below 5% at a temperature below 50° C. and under atmospheric pressure, and with water at a temperature below 100° C., and subsequently subjecting the materials to the action of a hot solution of an alkali metal bisulphite in which the ratio $SO_2:M_2O$ (where M is the alkali metal) is between 2.0 and 2.2 inclusive.

HENRY DREYFUS.